United States Patent
Yoshikawa (10) Patent No.: US 11,671,206 B2
(45) Date of Patent: Jun. 6, 2023

(54) COMMUNICATION APPARATUS FOR DETERMINATION OF HYBRID AUTOMATIC REPEAT REQUEST, METHOD OF CONTROLLING COMMUNICATION APPARATUS, AND NON-TRANSITORY COMPUTER-READABLE STORAGE MEDIUM FOR SAME

(71) Applicant: CANON KABUSHIKI KAISHA, Tokyo (JP)

(72) Inventor: Yuki Yoshikawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 168 days.

(21) Appl. No.: 17/181,121

(22) Filed: Feb. 22, 2021

(65) Prior Publication Data
US 2021/0297189 A1 Sep. 23, 2021

(30) Foreign Application Priority Data
Mar. 18, 2020 (JP) .............................. JP2020048026

(51) Int. Cl.
*H04W 72/04* (2023.01)
*H04L 1/1812* (2023.01)
*H04W 80/02* (2009.01)
*H04L 1/1829* (2023.01)

(52) U.S. Cl.
CPC .......... *H04L 1/1819* (2013.01); *H04L 1/1845* (2013.01); *H04W 80/02* (2013.01)

(58) Field of Classification Search
CPC ... H04L 1/1819; H04L 1/1845; H04L 1/1816; H04L 1/1825; H04W 80/02
See application file for complete search history.

(56) References Cited

U.S. PATENT DOCUMENTS

| | | | | |
|---|---|---|---|---|
| 6,865,233 B1* | 3/2005 | Eriksson | ............... | H04L 1/0009 375/261 |
| 10,219,249 B2* | 2/2019 | Kimura | ................. | H04L 1/1812 |
| 2006/0200722 A1* | 9/2006 | Braun | .................. | H04L 1/0013 714/748 |
| 2009/0016278 A1* | 1/2009 | Wakabayashi | ........ | H04W 72/08 370/329 |
| 2009/0177937 A1* | 7/2009 | Lee | ....................... | H04L 1/1887 714/E11.131 |
| 2009/0265599 A1* | 10/2009 | Chae | ..................... | H04L 1/1896 714/748 |
| 2011/0085500 A1* | 4/2011 | Sangiamwong | ...... | H04L 1/1816 370/328 |

(Continued)

FOREIGN PATENT DOCUMENTS

JP 2018050133 A 3/2018

*Primary Examiner* — Mahbubul Bar Chowdhury
(74) *Attorney, Agent, or Firm* — Carter, DeLuca & Farrell LLP (57) ABSTRACT

A communication apparatus performs data communication with another communication apparatus by using HARQ (Hybrid Automatic Repeat Request) in compliance with an IEEE 802.11 series standard, and determines, based on a state related to communication compliant with the IEEE 802.11 series standard of the communication apparatus, a retransmission type of the HARQ that the communication apparatus can use in data communication with the other communication apparatus in the communication.

12 Claims, 8 Drawing Sheets

(56) References Cited

U.S. PATENT DOCUMENTS

| | | | |
|---|---|---|---|
| 2011/0099446 A1* | 4/2011 | Murakami | H04L 1/1825 714/E11.131 |
| 2011/0126068 A1* | 5/2011 | Lee | H04L 5/0007 714/748 |
| 2015/0012793 A1* | 1/2015 | Ryu | H04W 72/1226 714/748 |
| 2017/0207885 A1* | 7/2017 | Lee | H04W 72/1215 |
| 2019/0229856 A1* | 7/2019 | Sano | H04W 52/48 |
| 2020/0344006 A1* | 10/2020 | Shellhammer | H04L 1/0011 |
| 2021/0099256 A1* | 4/2021 | Lee | H04L 1/1893 |
| 2021/0320753 A1* | 10/2021 | Shimezawa | H04L 1/0057 |
| 2022/0231797 A1* | 7/2022 | Song | H04L 1/1861 |

\* cited by examiner

| HARQ type value | Meaning |
|---|---|
| 0 | Chase Combining |
| 1 | Incremental Redundancy |
| 2 | Partial Chase Combining |
| 3 | Partial Incremental Redundancy |

COMMUNICATION APPARATUS FOR DETERMINATION OF HYBRID AUTOMATIC REPEAT REQUEST, METHOD OF CONTROLLING COMMUNICATION APPARATUS, AND NON-TRANSITORY COMPUTER-READABLE STORAGE MEDIUM FOR SAME

BACKGROUND OF THE INVENTION

Field of the Invention

The present invention is related to a wireless communication technique.

Description of the Related Art

In recent years, Internet usage is increasing year by year together with the development of information communication technologies, and various communication techniques are being developed in response to the increase in demand. Among these, a wireless local area network (WLAN) technology has realized increases in throughput in Internet communication of mobile terminal packet data, audio, video and the like, and currently various techniques therefor are being actively developed.

In the development of WLAN technology, the IEEE (Institute of Electrical and Electronics Engineers) 802, which is a wireless communication technique standardization institution, has played an important role in much of the standardization work. One of the main WLAN communication standards is the IEEE 802.11 series standards, and there are IEEE 802.11n/a/b/g/ac and IEEE 802.11ax standards. According to the specification of Japanese Patent Laid-Open No. 2018050133, in addition to high peak throughput of a maximum of 9.6 Giga bits per second (Gbps), communication speed increases under congestion conditions have been realized in IEEE 802.11ax by OFDMA (Orthogonal Frequency-Division Multiple Access).

For further throughput increases, a Study Group called IEEE 802.11 EHT (extremely high throughput) was launched as the subsequent standard to IEEE 802.11ax. On top of EHT's aim of realizing an increase in throughput, they are studying the application of a HARQ (Hybrid Automatic Repeat reQuest) with a soft combining technique between an access point (AP) and a station (STA).

HARQ is a technique that combines ARQ (automatic retransmission request) and error correction codes (FEC (forward error correction)) techniques. In a case where a reception apparatus, after receiving a packet to which a redundant error correction code transmitted from a transmission apparatus is added, successfully decodes the packet, the reception apparatus transmits an ACK (acknowledgement/confirmation response) packet to the transmission apparatus. In the case where a successful decoding is not possible, a NACK (negative acknowledgement) is transmitted, and retransmission from the transmission apparatus is awaited. The transmission apparatus, in the case of retransmission of a data packet to the reception apparatus, retransmits the same data as the previous time.

The main HARQ types are Chase Combining (hereinafter "CC"), and Incremental Redundancy (hereinafter "IR"). The retransmission behavior of these is different. With CC, the transmission apparatus retransmits the same packet as the packet that is the subject of the NACK. The reception apparatus, after receiving the retransmitted packet, performs Maximal Ratio Combining (MRC) with packets that have accumulated in a reception buffer, and performs decoding processing. With the CC type, power interference and SINR (signal-to-noise-and-interference ratio) increases. Meanwhile, there is the drawback that in the case where the channel conditions are good, redundant bits of all code words always end up being retransmitted. Meanwhile, with IR, the transmission apparatus, when retransmitting, transmits after performing a different encoding in accordance with the number of times the retransmission has been performed. In this IR, encoding gain is increased by combining packets, and a larger effect of reducing error in packets can be realized than with CC. Meanwhile, the processing is complicated, and the amount of required memory (buffer capacity) in the transmission apparatus and the reception apparatus increases.

As described above, in EHT, application of HARQ with a soft combining technique is being studied, but there has been no definition of a mechanism for the communication apparatus to determine which type can be used.

SUMMARY OF THE INVENTION

In the present disclosure, in view of the above problem to be solved by the invention, a technique for a communication apparatus to determine a retransmission method that can be used is provided.

According to one aspect of the present invention, there is provided a communication apparatus which comprises: a communication unit configured to perform data communication with another communication apparatus by using HARQ (Hybrid Automatic Repeat Request) in compliance with an IEEE 802.11 series standard; and a determination unit configured to, based on a state related to communication compliant with the IEEE 802.11 series standard of the communication apparatus, determine a retransmission type of the HARQ that the communication apparatus can use in data communication with the other communication apparatus by the communication unit.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
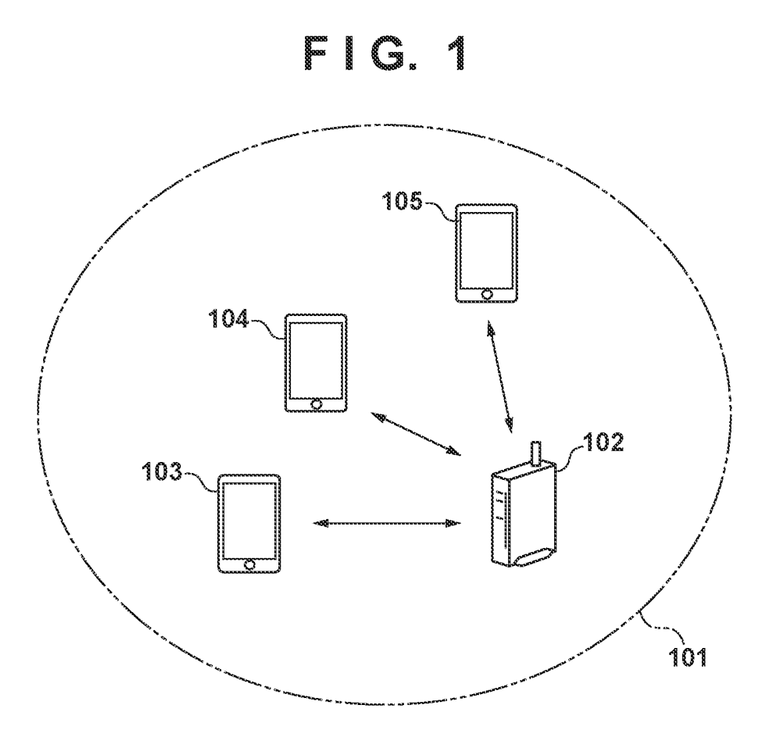
FIG. 1 illustrates an example of a network configuration.

FIG. 1 illustrates an example of a configuration of a network in a first embodiment. In FIG. 1, a network configuration including one access point (an AP 102) and three stations (an STA 103, an STA 104, and an STA 105), as wireless communication apparatuses, is illustrated. As illustrated in FIG. 1, the network that the AP 102 forms is indicated by a circle 101. In this embodiment, it is assumed that the STAs 103 to 105 can transmit/receive frames with respect to the AP 102. The STAs 103 to 105 and the AP 102 are assumed to be wireless communication apparatuses that can communicate by both the IR type (HARQ-IR) and the CC type (HARQ-CC) of HARQ (Hybrid Automatic Repeat Request). Note that the configuration illustrated in FIG. 1 is only an example, and for example, it is possible to apply the following discussion to a network including a large number of wireless communication apparatuses over a more extensive region and to the positional relationship between various wireless communication apparatuses.

Figure 2:
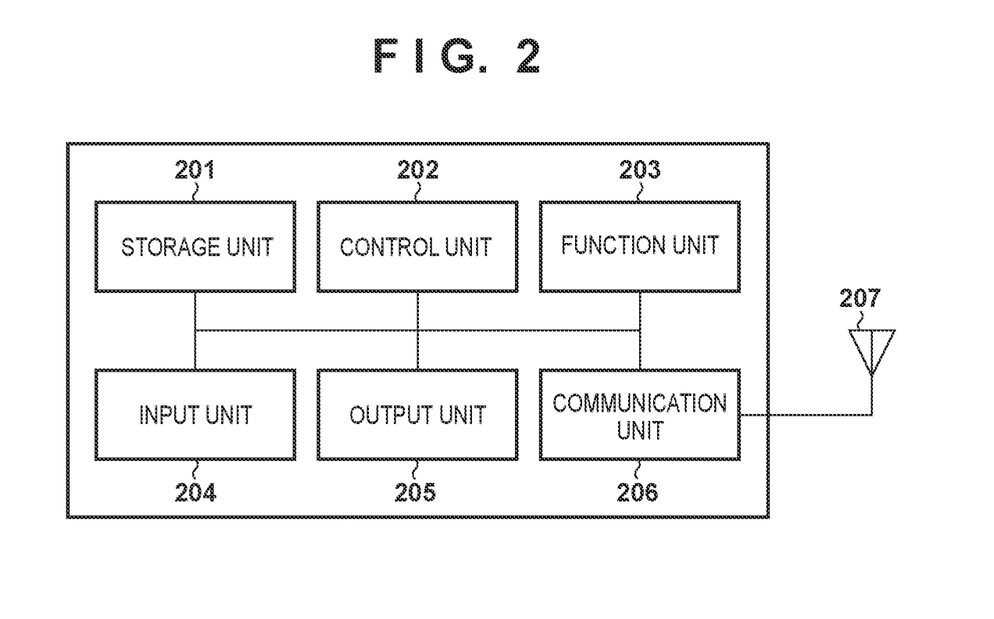
FIG. 2 illustrates an example of a hardware configuration of an AP and an STA.

FIG. 2 illustrates an example of a hardware configuration of an AP and an STA in this embodiment. The AP and the STA respectively have a storage unit 201, a control unit 202, a function unit 203, an input unit 204, an output unit 205, a communication unit 206, and an antenna 207 as an example of their hardware configuration.

The storage unit 201 is configured by a RAM and/or a ROM, and stores various information such as programs for performing various operations described later, communication parameters for wireless communication, and the like. As the storage unit 201, in addition to a memory such as a ROM or a RAM, a storage medium such as a floppy disk, a hard disk, an optical disk, a magneto-optical disk, a CD-ROM, a CD-R, a magnetic tape, a nonvolatile memory card, a DVD, or the like may be used.

The control unit 202 is configured by one or more processors such as CPUs and MPUs, an ASIC (application specific integrated circuit), a DSP (digital signal processor), an FPGA (field-programmable gate array), or the like, for example. Here, CPU is an acronym of Central Processing Unit, and MPU is an acronym of Micro Processing Unit. The control unit 202 controls the AP (STA) as a whole by executing a program stored in the storage unit 201. Note that the control unit 202 may control the AP (STA) as a whole by causing the program stored in the storage unit 201 and an OS (Operating System) to cooperate. In addition, a circuit for generating and decoding the error correction codes of HARQ may be included in the control unit 202. The control unit 202 controls the function unit 203 to execute predetermined processing such as imaging, printing, and projection. The function unit 203 is hardware for the AP (STA) to execute predetermined processing. For example, if the AP (STA) is a camera, the function unit 203 is an image capturing unit and performs image capturing processing. For example, if the AP (STA) is a printer, the function unit 203 is a print unit and performs print processing. For example, if the AP (STA) is a projector, the function unit 203 is a projector and performs processing for projecting. The data processed by the function unit 203 may be data stored in the storage unit 201, or data communicated from another communication apparatus via the communication unit 206 described later.

The input unit 204 accepts various operations from a user. The output unit 205 performs various outputs with respect to the user. Here, the output by the output unit 205 includes at least one of display on a screen, sound output by a speaker, vibration output, and the like. It should be noted that both the input unit 204 and the output unit 205 may be realized by one module as in a touch panel.

The communication unit 206 controls wireless communication compliant with an IEEE 802.11 series standard, and controls IP (Internet Protocol) communication. In this embodiment, the communication unit 206 can execute processing complying with at least the IEEE 802.11ax standard. In addition, the communication unit 206 controls the antenna 207 to transmit/receive a wireless signal for wireless communication. The AP (STA) communicates content such as image data, document data, or video image data to another communication apparatus via the communication unit 206.

The antenna 207 is an antenna that can receive any wireless signals in a respective sub-GHz band, a 2.4 GHz band, a 5 GHz band, and a 6 GHz band. The antenna 207, to realize MIMO (Multi-Input and Multi-Output) transmission/reception, may be configured physically by more than one antennas.

Figure 3:
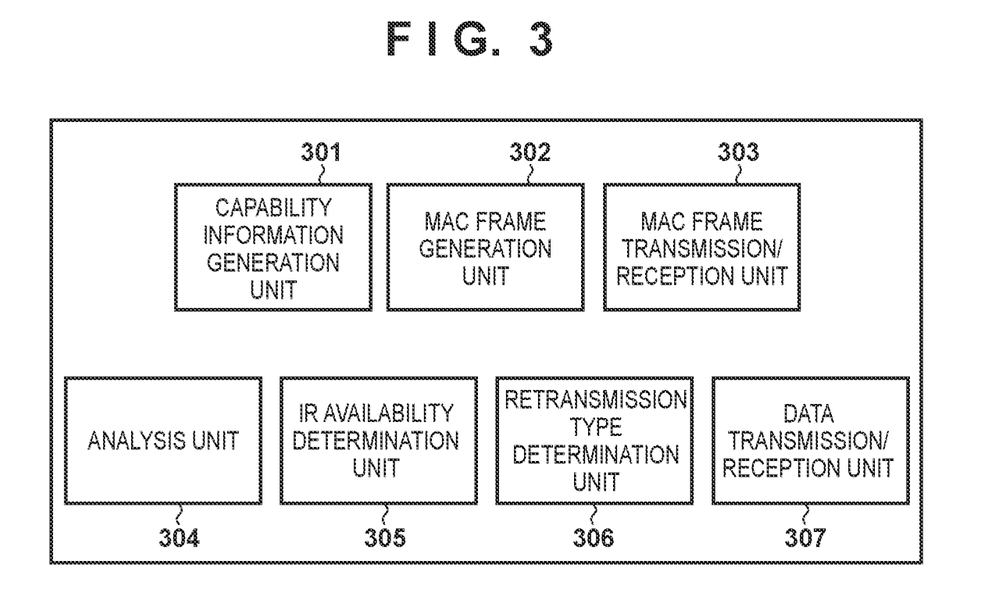
FIG. 3 illustrates an example of a functional configuration of an AP and an STA.

FIG. 3 illustrates an example of a functional configuration of an AP and an STA in this embodiment. The AP and the STA have, as an example of their functional configuration, a capability information generation unit 301, a MAC frame generation unit 302, a MAC frame transmission/reception unit 303, an analysis unit 304, an IR availability determination unit 305, a retransmission type determination unit 306, and a data transmission/reception unit 307 respectively.

The capability information generation unit 301 generates information (capability information) related to capabilities of the AP (the STA). In this embodiment, the capability information generation unit 301 generates HARQ capability information (HARQ elements) which includes information such as whether or not HARQ is supported (whether or not a HARQ data communication is possible) and the HARQ types that are supported when HARQ is supported.

A MAC (Media Access Control) frame generation unit 303 generates a MAC frame that stores capability information generated by the capability information generation unit 301 as necessary. This MAC frame is a MAC frame that complies with an IEEE 802.11 series standard, and, for example, is a management frame such as a Beacon frame, a Probe Request frame, a Probe Response frame, an Association Request frame, an Association Response frame, a Reassociation Request frame, a Reassociation Response frame, an Action frame, or a control frame such as a Trigger frame.

Figure 5:
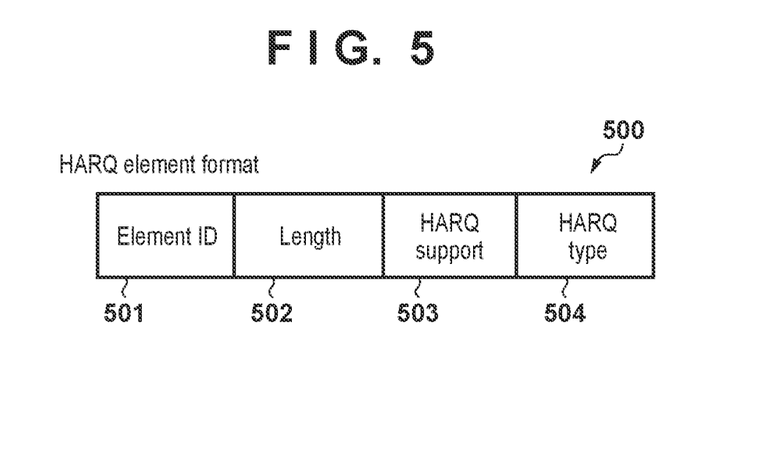
FIG. 5 illustrates an example of the HARQ capability information.

In FIG. 5, an example of a HARQ capability information (HARQ element) format is illustrated. A HARQ element 500 of FIG. 5 is an element for a device to indicate in what format it desires to communicate. The HARQ element 500, similarly to other information elements as set forth in the IEEE 802.11 series standards, is configured by information of the Element ID field 501 that identifies an Element, a Length field 502 that indicates a data length of the Element, and information that is specific to the Element. The HARQ element 500 is information that can be added to the previously described MAC frame.

Figure 6:
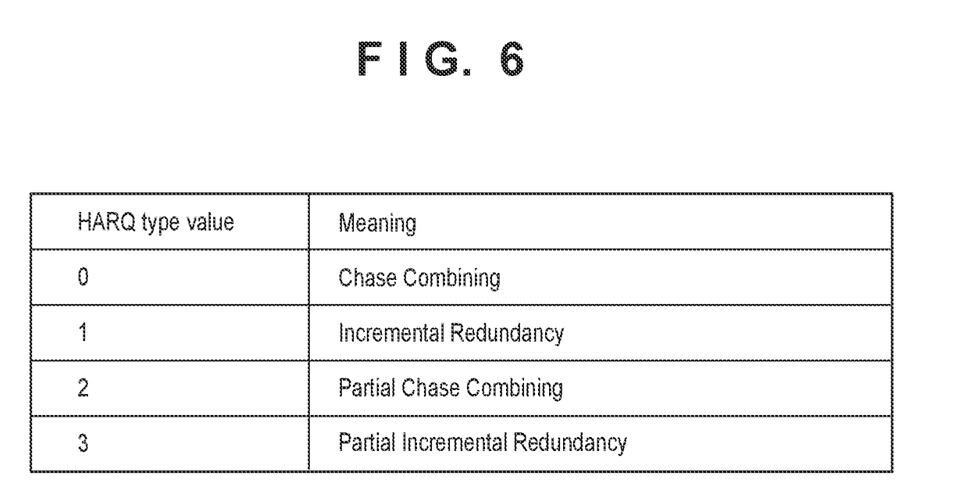
FIG. 6 illustrates an example of a correspondence of values that the HARQ type indicates and the meanings of those values.

A HARQ support field 503 is information indicating whether or not HARQ is supported (whether or not data communication using HARQ is possible), and for example, in a case where the HARQ support field 503 is 0. HARQ is indicated to be supported, and in the case of 1. HARQ is unsupported. Note that without using the HARQ support field 503, based on whether the HARQ element 500 is included in the MAC frame, the frame receiving-side apparatus may determine whether or not HARQ is supported. A HARQ type field 504 is information indicating a type of HARQ that is supported, in a case where HARQ is supported. The value of the HARQ type field 504 corresponds to the values as illustrated in FIG. 6, for example. FIG. 6 illustrates an example of correspondence between the values that the HARQ type indicates and the meaning of those values. The correspondence of FIG. 6 is just one example, and other correspondences are possible. For example, a predetermined type and a bit that corresponds to that predetermined type may be specified, and in a case where the AP 102 indicates that it supports that predetermined type, the value of the bit corresponding to that type is set to 1 in a Beacon frame. In such a case, the STAs 103 to 105 can decide the type of HARQ in accordance with the types that the AP 102 supports. Alternatively, a setting so that, in the case where the value is 0 only HARQ-CC is supported, but in the case where the value is 1. HARQ-CC and HARQ-IR are supported is possible. In such a case, the AP 102 can be thought to support more advanced types the higher the value is, and it is possible to keep the bit size of the representation small for the supported HARQ types and combinations. Also, in the case where a plurality of HARQ types are supported, support may be expressed by adding a plurality of HARQ elements.

Returning to the description of FIG. 3, the MAC frame transmission/reception unit 303, via the communication unit 206, transmits a MAC frame generated by the MAC frame generation unit 302 and receives a MAC frame from the partner device. The analysis unit 304 analyzes a MAC frame received by the MAC frame transmission/reception unit 303, and extracts predetermined information. For example, the analysis unit 304 analyzes the received MAC frame, and extracts whether or not HARQ is supported by the partner device (the device that is the transmission origin of the MAC frame) or the like. The analysis unit 304, based on the results of this analysis, determines whether or not it is possible for the partner device to perform data communication using HARQ (whether or not to perform data communication using HARQ with the partner device). The IR availability determination unit 305, by confirming the bandwidth of the connection with the partner device and the free capacity of a buffer of the self-apparatus and the like, determines whether or not it is possible to perform data communication using HARQ-IR. The retransmission type determination unit 306 decides one of the retransmission communication methods with respect to the partner device (hereinafter, retransmission type), specifically, HARQ-IR, HARQ-CC, and ARQ (automatic retransmission request). This decision can be made based on at least one of the result of analysis by the analysis unit 304, the result of the determination by the IR availability determination unit 305, and the type of MAC frame received by the MAC frame transmission/reception unit 303. ARQ is a retransmission type that is supported in conventional IEEE 802.11 series standards such as IEEE 802.11ax. The data transmission/reception unit 307 uses the retransmission type decided by the retransmission type determination unit 306 to perform transmission/reception of data frames.

(Flow of Processing)

In this embodiment, the STA, based on a state related to communication that complies with an IEEE 802.11 series standard, determines a retransmission type (HARQ-IR, HARQ-CC, ARQ) that can be used in data communication with a partner device (AP). On top of that, the STA decides a retransmission type that is used for data communication with the AP. The example of a state related to communication that complies with this standard is a capability (performance) regarding HARQ in the STA. As described above, in HARQ-IR, encoding gain is improved by combining packets, and while it is possible to realize a larger effect of reducing packet errors than HARQ-CC, the processing becomes complicated, and the required buffer capacity may become larger. In this embodiment, it is assumed that the STA 103 and the STA 104 can allocate a buffer region (free capacity of a buffer) that is needed for data communication that uses HARQ-IR, but the STA 105 cannot allocate such a buffer region.

Figure 4:
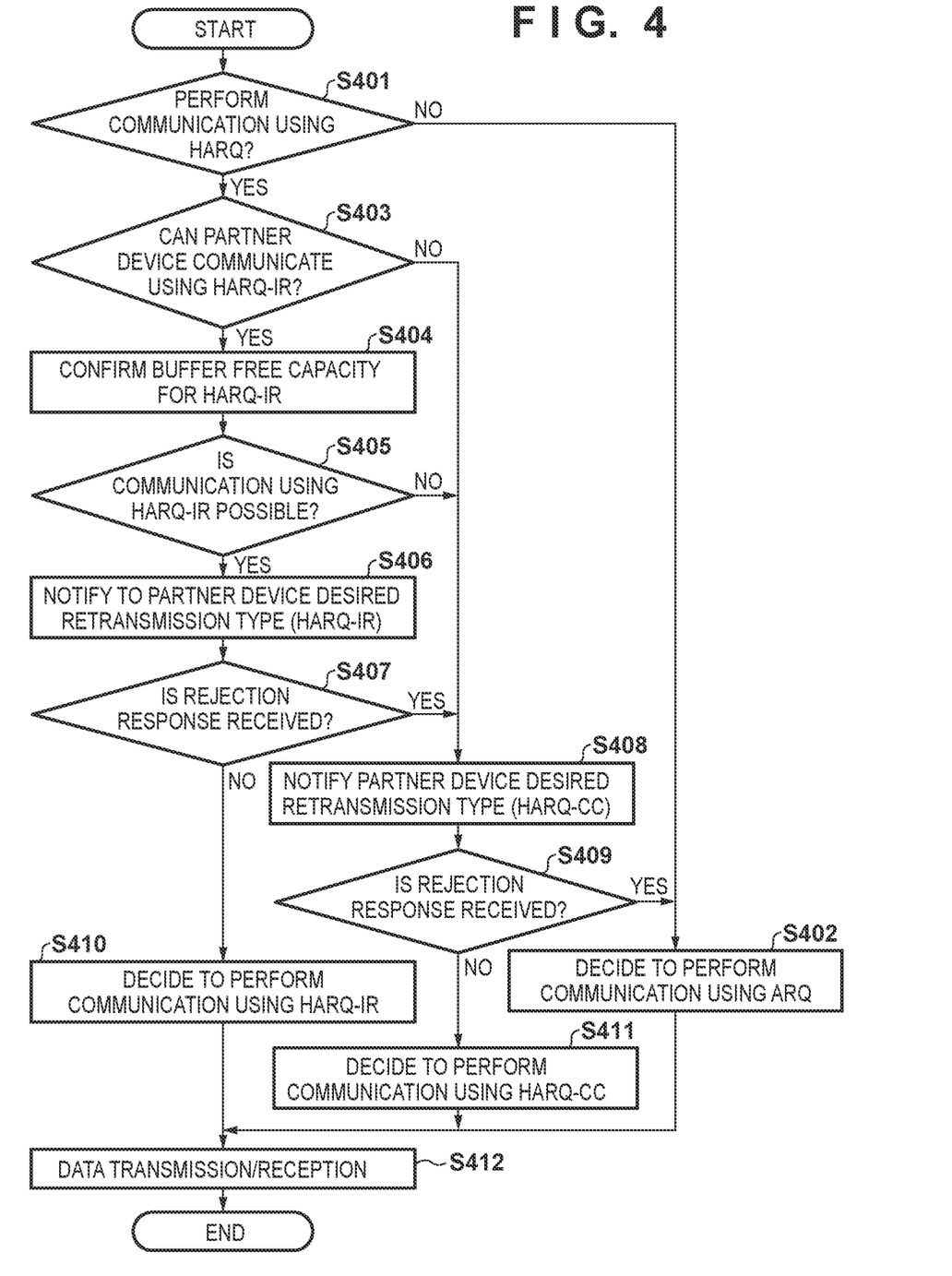
FIG. 4 is a flowchart up to when the STA performs data transmission/reception.

FIG. 4 illustrates a flowchart of processing that is executed by the STAs 103 to 105 up until when data transmission/reception is performed. The STAs 103 to 105 will be collectively expressed as "the STA". The flowchart illustrated in FIG. 4 may be realized by the control unit 202 of the STA executing a control program stored in the storage unit 201 and executing information calculation and processing and control by respective hardware. The processing illustrated in this flowchart may be started when the STA starts (requests) a connection with the AP 102. Note that during the connection of the STA with the AP 102, this flowchart may be started triggered by the STA receiving an Action frame, for example.

First, the analysis unit 304 of the STA determines whether or not to perform data communication using HARQ with the AP 102 (step S401). The analysis unit 304, for example, analyzes a Beacon frame that the AP 102 periodically transmits and a Probe Response frame that is sent back in response to the transmitted Probe Request frame which are received by the MAC frame transmission/reception unit 303. Specifically, the analysis unit 304, depending on whether or not the HARQ element 500 (refer to FIG. 5) is included in the received frame that was previously-described (whether or not the AP 102 supports HARQ), determines whether or not data communication using HARQ with the AP 102 may be performed. Also, the analysis unit 304, in a case where the HARQ element 500 is included in the received frame that was previously-described, may determine whether or not to perform data communication using HARQ with the AP 102 depending on whether the value of the HARQ support field 503 is 1 (whether or not the AP 102 supports HARQ). The analysis unit 304, in the case where the AP 102 determines that HARQ is supported, determines to perform data communication using HARQ, and otherwise determines not to perform data communication using HARQ.

In a case where it is determined by the analysis unit 304 not to perform data communication using HARQ (No in step S401), the retransmission type determination unit 306 decides (step S402) to perform data communication using ARQ rather than performing data communication using HARQ. Meanwhile, the analysis unit 304, in the case where the AP 102 determines to perform data communication using HARQ (Yes in step S401), determines (step S403) whether or not the AP 102 can perform data communication using HARQ-IR, specifically whether or not HARQ-IR is supported. Specifically, the analysis unit 304 confirms the value (refer to FIG. 6) of the HARQ type field 504 in the HARQ element 500. In a case where it is determined (No in step S403) that the AP 102 supports only HARQ-CC by the analysis unit 304, a notification is made (step S408) to the AP 102 that the desired retransmission type of the MAC frame transmission/reception unit 303 is HARQ-CC. As an example of specific processing, first, the MAC frame generation unit 302 generates an Association Request frame that designates HARQ-CC as the desired retransmission type when connecting with the AP 102, for example. This Association Request frame has the HARQ element 500 (FIG. 5) and the desired retransmission type may be designated by the HARQ support field 503. Then, the MAC frame transmission/reception unit 303 transmits the Association Request frame.

Meanwhile, in a case where it is determined by the analysis unit 304 that the AP 102 only supports HARQ-IR or supports HARQ-CC and HARQ-IR (Yes in step S403), the processing advances to step S404. In step S404, the IR availability determination unit 305 confirms a buffer region (a buffer free capacity) that can be used for communication using HARQ-IR. As an example of specific processing, the IR availability determination unit 305 confirms the free capacity of the buffer that the STA itself can allocate or the free capacity of memory. The timing at which the free capacity of the memory is confirmed is advantageously immediately prior to the connection with the AP 102 for more optimal memory usage, but the invention is not limited to this. For example, in a case where the IR availability determination unit 305 confirms the free capacity of a buffer upon activation of the power supply of the STA, and determines that data communication using HARQ-IR cannot be performed, it is not necessary to perform a confirmation immediately prior to the connection. Also, in a case where an application that should be prioritized is activated during the connection with the AP 102, the IR availability determination unit 305 may confirm the free capacity of the buffer that can be allocated after activation of the application. By this, it becomes possible to allocate memory to a prioritized application. The IR availability determination unit 305, regardless of the operation of other applications, may confirm the buffer capacity that can be allocated within the STA periodically. When a free capacity of a buffer that is needed for data communication using HARQ-CC and HARQ-IR is established, and there is a change by which that threshold is exceeded or the free capacity falls therebelow, the STA may start from the processing of step S404 of the flowchart of FIG. 4. The buffer free capacity may include a memory capacity added by a connection to the product in addition to the size of a memory that is built into the product.

The free capacity of the buffer necessary for data communication using HARQ-IR may change depending on the width of the frequency band (connection bandwidth) over which the AP 102 and the STAs 103 to 105 connect. For example, there is a difference of approximately four-times in the free capacity of the buffer needed between the case of connecting with 80 MHz and a case of connecting with 320 MHz. Also, the free capacity of the buffer that is necessary differs depending on the time (retention time) over which data is retained in memory during communication. In a case where the retention time is variable in accordance with the standard, the difference may be five-times between when the retention time is made to be 1 ms and when it is made to be 5 ms. Such information, when connection processing is performed, can be known by the STA from a Beacon frame and a Probe Response frame transmitted from the AP 102. The IR availability determination unit 305, depending on the width of the connection band and the retention time during data communication, changes (sets) the threshold of the free capacity of the buffer that is necessary for data communication using HARQ-CC and HARQ-IR. On top of that, the IR availability determination unit 305 determines (step S405) whether or not it is possible to perform data communication using HARQ-IR (whether or not it is possible to use HARQ-IR).

In a case where the IR availability determination unit 305 determines (No in step S405) that it is not possible to perform data communication using HARQ-IR, such as when the free capacity of the buffer does not meet the threshold, the MAC frame transmission/reception unit 303 notifies (step S408) the AP 102 that the desired retransmission type is HARQ-CC. An example of the specific processing of step S408 is as described above. In a case where the IR availability determination unit 305 determines (Yes in step S405) that it is possible to perform data communication using HARQ-IR, such as when the free capacity of the buffer is the threshold or more, the MAC frame transmission/reception unit 303 notifies (step S406) the AP 102 that the desired retransmission type is HARQ-IR. As an example of specific processing, first, the MAC frame generation unit 302 generates an Association Request frame that designates HARQ-IR as the desired retransmission type when connecting with the AP 102, for example. The Association Request frame has the HARQ element 500 (FIG. 5), and the desired retransmission type can be designated by the HARQ support field 503. Then, the MAC frame transmission/reception unit 303 transmits the Association Request frame.

The MAC frame transmission/reception unit 303, after making a notification (step S406) to the AP 102 that the desired retransmission type is HARQ-IR, awaits a response to the notification. In a case where the response is received, the analysis unit 304 determines (step S407) whether or not that response is a rejection response. As the specific processing example, in step S406, in the case of transmitting an Association Request frame that designates HARQ-IR as the desired retransmission type when connecting with the AP 102, the MAC frame transmission/reception unit 303 awaits the reception of an Association Response frame. In the case of receiving the Association Response frame by the MAC frame transmission/reception unit 303, the analysis unit 304 analyzes that frame, and determines whether or not information indicating that data communication using HARQ-IR is rejected is included therein. In the case where information indicating that data communication using HARQ-IR is rejected is included therein, the analysis unit 304 determines that the response is a rejection response, and otherwise, determines that the response is not a rejection response. In a case where it is determined that the rejection response was not received (obtained) (No in step S407), the retransmission type determination unit 306 decides (step S410) to perform data communication using HARQ-IR.

In a case where it is determined by the analysis unit 304 that the rejection response was received (obtained) (Yes in step S407), the MAC frame transmission/reception unit 303 may make a notification (step S408) to the AP 102 that the desired retransmission type is HARQ-CC. The MAC frame transmission/reception unit 303, after making a notification (step S408) to the AP 102 that the desired retransmission type is HARQ-CC, awaits a response to the notification. In a case where the response is received, the analysis unit 304 determines (step S409) whether or not that response is a rejection response. As the specific processing example, in step S408, in the case of transmitting the Association Request frame that designates HARQ-CC as a desired retransmission type when connecting with the AP 102, the MAC frame transmission/reception unit 303 awaits the reception of the Association Response frame. In the case of receiving the Association Response frame by the MAC frame transmission/reception unit 303, the analysis unit 304 analyzes that frame, and determines whether or not information indicating that data communication using HARQ-CC is rejected is included therein. In the case where information indicating that data communication using HARQ-CC is rejected is included therein, the analysis unit 304 determines that the response is a rejection response, and otherwise, determines that the response is not a rejection response. In a case where it is determined that the rejection response was not received (obtained) (No in step S409), the retransmission type determination unit 306 decides (step S411) to perform data communication using HARQ-CC.

In the case where it is determined (Yes in step S409) by the analysis unit 304 that a rejection response is received (obtained), the retransmission type determination unit 306 decides (step S402) to perform data communication using ARQ. Note that in the case where data communication using another retransmission type is possible, the MAC frame transmission/reception unit 303 may make a notification to the AP 102 that the desired retransmission type is the other retransmission type. Also, in the STA, a timer (not shown) is installed, and the MAC frame transmission/reception unit 303 may recognize that a desired retransmission type was rejected by the AP 102 based on a response not being received for a fixed time (for example, Association Response). In such a case, the MAC frame transmission/reception unit 303 may notify the AP 102 that the desired retransmission type is ARQ or another HARQ type.

After that, the data transmission/reception unit 307 performs data transmission/reception (step S412) by using the retransmission type decided by the retransmission type determination unit 306.

Note that the STA, in the case where the processing illustrated in FIG. 4 is performed after the connection with the AP 102, a notification of the desired retransmission type may be made (retransmission type (connection type) change notification) by using the Action frame, for example. Alternatively, a control frame such as an UL (uplink) or DL (downlink) Trigger frame that is a signal for transmitting data all at once may be used.

Also, a confirmation of the free capacity of the buffer for performing communication using HARQ-IR and the connection band (the frequency band for when connecting) may be performed by the IR availability determination unit 305 prior to step S401. Also, the STA may use this confirmation result as an index as to whether or not to perform data communication using HARQ. Also, in processing of FIG. 4, the IR availability determination unit 305, based on the width of the connection band and a received data retention time, sets the threshold for the free capacity of the buffer needed for HARQ-IR, and thereafter, the retransmission type determination unit 306 decides the type of HARQ based on that threshold. The processing order of the threshold setting and the HARQ type decision may be reversed. Specifically, the HARQ type that the retransmission type determination unit 306 desires is set to HARQ-IR, and thereafter, the IR availability determination unit 305 calculates a free capacity of the buffer that is necessary for HARQ-IR, and from a frequency bandwidth that can communicated with the current free capacity of the buffer, the STA may obtain a desired frequency bandwidth. By this, even if the partner device only supports a specific HARQ type, data communication by that indicated type becomes possible.

In the example of FIG. 4, the width of the connection band and the data retention time are used to decide the HARQ type, but this is only one example, and other processing related to memory use may be applied to step S405. For example, the HARQ type may be decided based on whether or not Green field is used, whether or not A-MSDU (Aggregation MAC Service Data Unit) is used, the maximum size when A-MSDU or A-MPDU (Aggregation MAC Protocol Data Unit) is received, the maximum data rate that includes MCS (Modulation and Coding Scheme), whether or not there is beamform processing, a security scheme including an authentication scheme (PSK, SAE, EAP) and an encryption scheme (TKIP, AES), whether or not there is FTM (Fine Timing Measurement) processing, whether or not there is Wi-Fi Direct or Wi-Fi Aware processing, whether or not there is LDPC (low density parity inspection coding) or Block ACK processing, whether or not there is transmission/reception of CSI (channel condition information) information, whether or not information on the periphery of the STA such as a Beacon Report is transmitted, and the like, or may be something that changes the above threshold depending on the HARQ type.

In this fashion, by virtue of the present embodiment, the STA confirms the free capacity of its own buffer, and obtains information of the functions (capabilities) that the AP 102 supports, to thereby be able to decide the type of HARQ to be used for data communication. Also, the AP 102, for each STA, is enabled to decide to perform data communication using HARQ-CC, HARQ-IR, or the ARQ, and enabled to employ a communication method that is suitable for the STA.

Second Embodiment

In this embodiment, the AP, based on a state related to communication that complies with an IEEE 802.11 series standard, determines a retransmission type (HARQ-IR, HARQ-CC, ARQ) that can be used in data communication with a partner device (STA). On top of that, the STA decides a retransmission type that is used for data communication with the AP. One example of a state related to communication that complies with this standard is a capability (performance) regarding HARQ in the AP. Differences from the first embodiment will be described below. In this embodiment, it is assumed that the STA 103 and the STA 104 can allocate a buffer region (free capacity of a buffer) that is needed for data communication that uses HARQ-IR, but the STA 105 cannot allocate such a buffer region.

Figure 7A:
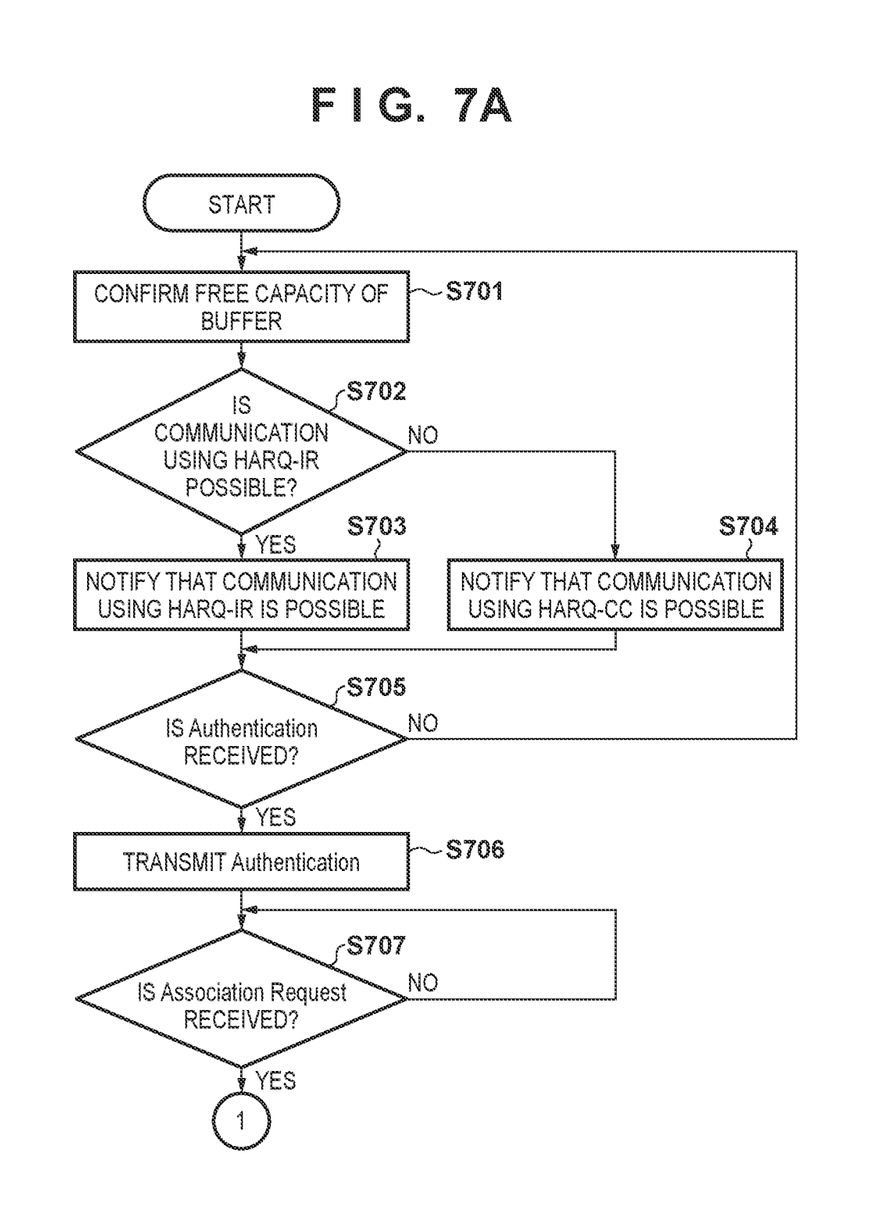
FIG. 7A and FIG. 7B are flowcharts up to when the AP performs data transmission/reception.
Figure 7B:
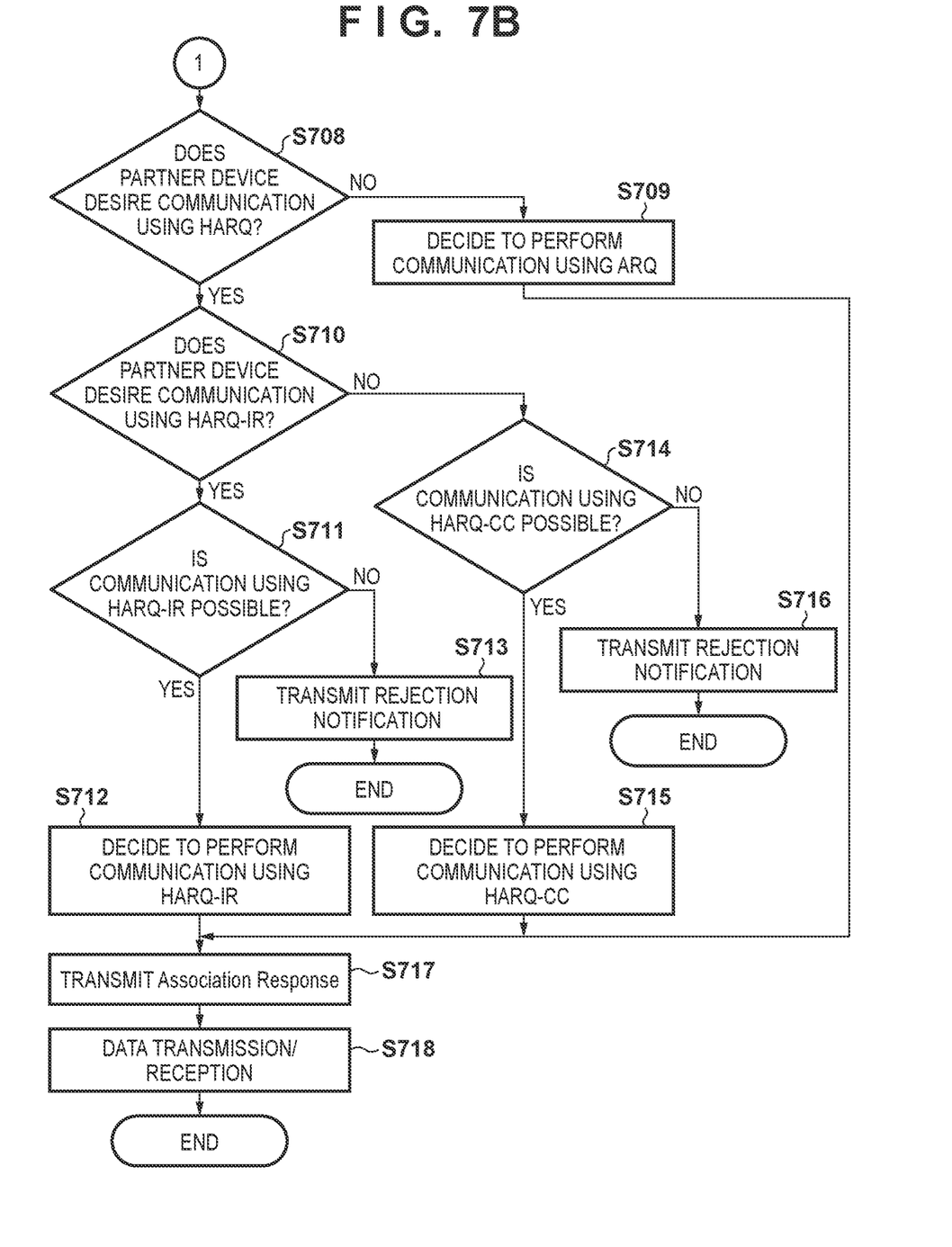

FIG. 7A and FIG. 7B illustrate flowcharts of processing that is executed by the AP 102 up until when data transmission/reception is performed. The flowcharts illustrated in FIG. 7A and FIG. 7B may be realized by the control unit 202 of the AP 102 executing a control program stored in the storage unit 201 and executing information calculation and processing and control by respective hardware. The processing illustrated in this flowchart may be started when one of the STAs 103 to 105 request a connection to the AP 102.

First, the IR availability determination unit 305 confirms (step S701) the width of a maximum frequency band (connection bandwidth) desired when starting operation as the AP and a buffer region (free capacity of the buffer) that can be used for communication using HARQ-IR. The IR availability determination unit 305, from the confirmed value of the capacity, determines (step S702) whether or not it is possible to perform data communication using HARQ-IR in a maximum connection bandwidth that is desired (whether or not HARQ-IR can be used). Note that the IR availability determination unit 305 may, additionally or alternatively, perform the determination based on the number of STAs that the AP 102 is currently connected to. Also, the IR availability determination unit 305 may, additionally or alternatively, make that determination based on whether or not DL communication (downlink communication) or UL communication (uplink communication) is performed simultaneously to a plurality of STAs that use a trigger frame. Also, the IR availability determination unit 305 may perform that determination depending on environmental factors such as the functions that the chip currently installed in the AP 102 has and the number of frames around transmission/reception in the frequency band in which communication is performed.

In a case where the IR availability determination unit 305 determined (No in step S702) that it is not possible to perform data communication using HARQ-IR such as when it is not possible to allocate the empty buffer capacity needed for HARQ-IR, the MAC frame transmission/reception unit 303 makes a notification (step S704) to the STA that it is possible to perform data communication using HARQ-CC. As a specific processing example of step S704, first, the MAC frame generation unit 302 generates a Beacon frame and a Probe Response frame designating HARQ-CC as the type of HARQ. This Beacon frame and Probe Response frame have the HARQ element 500 (FIG. 5) and the available retransmission types may be designated by the HARQ support field 503. Next, the MAC frame transmission/reception unit 303 transmits a Beacon frame and a Probe Response frame. Meanwhile, in a case where the IR availability determination unit 305 determines (Yes in step S702) that it is possible to perform data communication using HARQ-IR such as when it is possible to allocate an empty buffer capacity needed for HARQ-IR, the MAC frame transmission/reception unit 303 notifies (step S703) the STA that it is possible to perform data communication using HARQ-IR. As a specific example of the processing of step S703, first, the MAC frame generation unit 302 generates a Beacon frame and a Probe Response frame designating HARQ-IR as the HARQ type. This Beacon frame and Probe Response frame have the HARQ element 500 (FIG. 5) and an available retransmission type can be designated by the HARQ support field 503. Next, the MAC frame transmission/reception unit 303 transmits a Beacon frame and a Probe Response frame. Note that configuration may be such that, in the case where the IR availability determination unit 305 determines that it is not possible to perform data communication using HARQ-IR, the MAC frame generation unit 302 does not add the HARQ element 500 in the frame to be transmitted or sets the value of the HARQ support field 503 to 0.

In a case where the STA requests a connection with respect to the AP 102, it transmits an Authentication frame to the AP 102. In a case where the MAC frame transmission/reception unit 303 does not receive the Authentication frame (No in step S705), the processing returns to step S701. The MAC frame transmission/reception unit 303, in the case where it has received this the Authentication frame (Yes in step S705), returns the Authentication frame (step S706). Note that the invention is not limited to the processing of step S705 and step S706 (specifically, the Authentication process). Depending on the processing configuration, the processing of step S705 and step S706 may be omitted. Also, when connecting by SAE (Simultaneous Authentication of Equals), in place of the frame transmission/reception in step S705 and step S706, transmission/reception of SAE commit and transmission/reception of SAE confirm may be performed.

Next, in the case where the MAC frame transmission/reception unit 303 receives the Association Request frame from the STA (Yes in step S707), the processing advances to step S708. In step S708, the analysis unit 304, by confirming whether or not the HARQ element 500 (refer to FIG. 5) is included in the received Association Request frame, determines whether or not the STA desires communication using HARQ. In step S708, the analysis unit 304, in a case where the HARQ element 500 is included in the received frame, may determine whether or not the STA desires data communication using HARQ based on whether or not the HARQ support field 503 is 1. In a case where it is determined by the analysis unit 304 that the STA does not desire data communication using HARQ (No in step S708), the retransmission type determination unit 306 decides (step S709) to perform data communication using ARQ. After that, the MAC frame transmission/reception unit 303 transmits (step S717) the Association Response frame. In this Association Response frame, the HARQ element 500 is not included or a HARQ element 500 for which the value of the HARQ support field 503 is 1 may be included.

The analysis unit 304, in the case where it is determined that the STA desires communication using HARQ (Yes in step S708), determines (step S710) whether the desire of the STA is HARQ-IR or HARQ-CC. The analysis unit 304, for example, can perform the determination by confirming the value of the HARQ type field 504 in the HARQ element 500. In the case where it is determined (Yes in step S710) by the analysis unit 304 that the STA desires HARQ-IR, the IR availability determination unit 305 determines (step S711) whether or not it is possible for the AP 102 itself to perform data communication using HARQ-IR. In the processing of step S711, the determination criteria used in the processing of step S701 and step S702 may be used again, and the result of the processing of step S701 and step S702 may be used as is. Also, the determination in step S711 may be made based on the amount of a change in free capacity of the buffer between the point in time when the free capacity of the buffer was confirmed in the processing of step S701 and step S702 and the point in time when the Association Request frame was received.

In the case where the result of the determination is that it is determined that the data communication using HARQ-IR cannot be performed (No in step S711), the MAC frame transmission/reception unit 303 makes a notification (transmits a rejection notification) to the STA that data communication using HARQ-IR cannot be performed (rejection). The frame used at this time may be an Association Response frame or may be another frame. In the case of using an Association Response frame, the MAC frame generation unit 302 includes information indicating that the data communication using HARQ-IR is rejected, and the MAC frame transmission/reception unit 303 transmits that frame as the rejection response (rejection notification). Also, the MAC frame transmission/reception unit 303, by not transmitting the Association Response frame, may make a notification that the data communication using HARQ-IR is rejected.

Meanwhile, in the case where it is determined that it is possible to perform data communication using HARQ-IR (Yes in step S711), the retransmission type determination unit 306 decides (step S712) to perform data communication using HARQ-IR. After that, the MAC frame transmission/reception unit 303 transmits the Association Response frame (step S717). In this Association Response frame, the value of the HARQ support field 503 is 0, or the HARQ element 500 for which the value of the HARQ type field 504 is 1 may be included.

In a case where it is determined (No in step S710) that the STA desires HARQ-CC by the analysis unit 304, the IR availability determination unit 305 determines (step S714) whether or not the AP 102 itself can perform data communication using HARQ-CC. In the processing of step S714, the determination criteria used in the processing of step S701 and step S702 may be used again, and the results of the processing of step S701 and step S702 may be used unchanged. Also, the determination in step S714 may be made based on the amount of a change in free capacity of the buffer between the point in time when the free capacity of the buffer was confirmed in the processing of step S701 and step S702 and the point in time when the Association Request frame was received.

In the case where the result of the determination is that it is determined that the data communication using HARQ-CC cannot be performed (No in step S714), the MAC frame transmission/reception unit 303 makes a notification (transmits a rejection notification) to the STA that data communication using HARQ-CC cannot be performed (rejection). The frame used at this time may be an Association Response frame and may be another frame. In the case of using an Association Response frame, the MAC frame generation unit 302 includes information indicating that the data communication using HARQ-CC is rejected, and the MAC frame transmission/reception unit 303 transmits that frame as the rejection response (rejection notification). Also, the MAC frame transmission/reception unit 303, by not transmitting the Association Response frame, may make a notification that the data communication using HARQ-CC is rejected.

Meanwhile, in the case where it is determined that it is possible to perform data communication using HARQ-CC (Yes in step S714), the retransmission type determination unit 306 decides (step S715) to perform data communication using HARQ-CC. After that, the MAC frame transmission/reception unit 303 transmits (step S717) the Association Response frame. In this Association Response frame, the value of the HARQ support field 503 is 0, or the HARQ element 500 for which the value of the HARQ type field 504 is 0 may be included.

Note that the AP 102, after having transmitted the rejection notification in step S713 and step S716, in the case where a reconnection from the STA is requested, the processing from step S705 maybe be started, and the processing from step S707 may be started. Also, the AP 102, after transmitting the Association Response frame, may or may not execute a 4 way handshake.

Thereafter, the data transmission/reception unit 307, using the retransmission type decided by the retransmission type determination unit 306, performs data transmission/reception (step S718).

Figure 8:
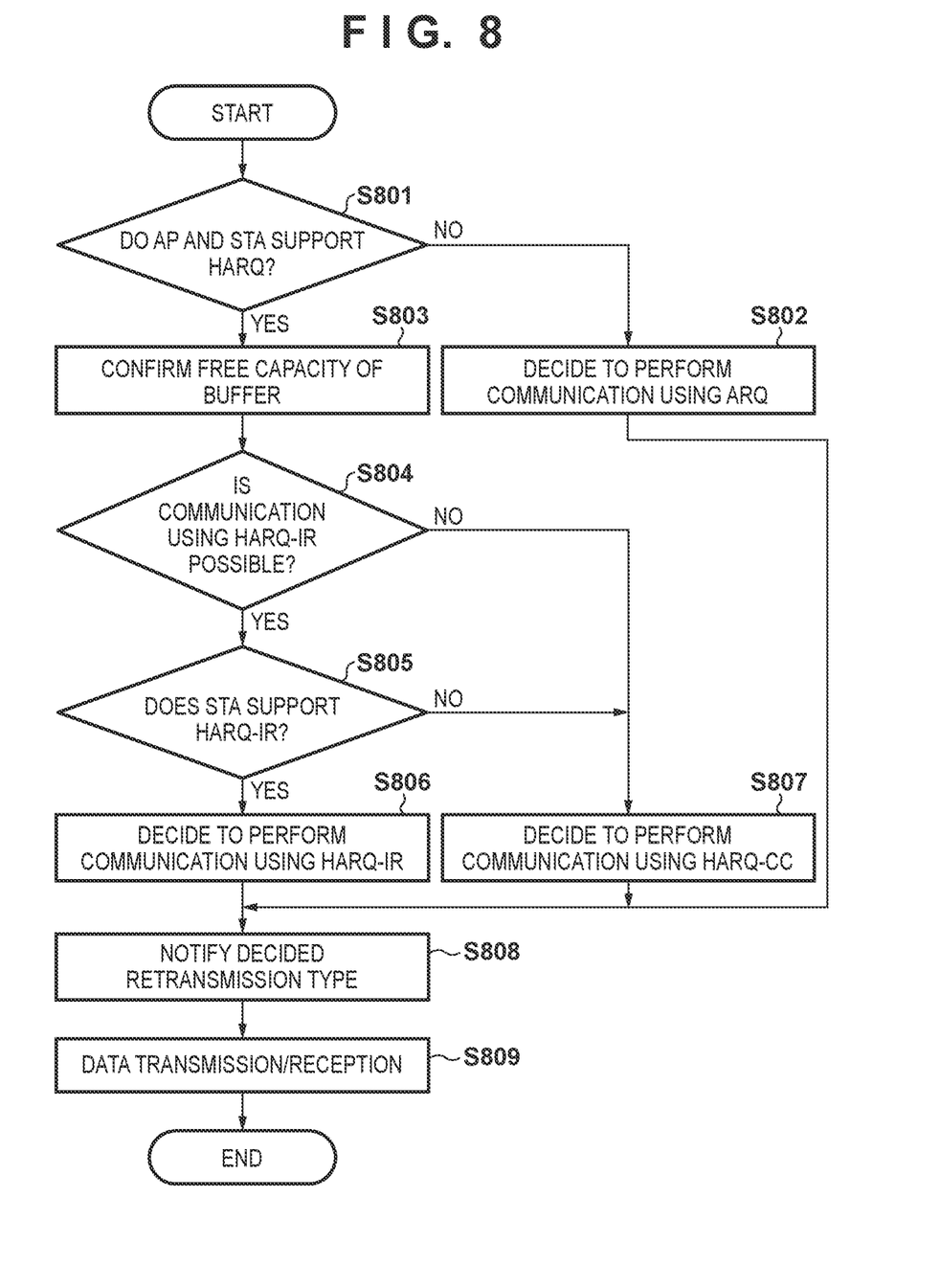
FIG. 8 is another flowchart up to when the AP performs data transmission/reception.

FIG. 8 illustrates a flowchart of processing that is executed by the AP 102 up until when the AP performs data transmission/reception. The flowchart illustrated in FIG. 8 may be realized by the control unit 202 of the AP 102 executing a control program stored in the storage unit 201 and executing information calculation and processing and control by respective hardware. The processing illustrating in this flowchart may be started when there are one or more STAs that the AP 102 is connected to, and data transmission/reception is attempted with respect to the STAs. Also, the processing may be started when one of the STAs 103 to 105 made a request for a connection to the AP 102.

First, the control unit 202 of the AP 102 confirms (step S801) whether or not the AP 102 itself and each of the one or more connected STAs supports HARQ (can handle HARQ). Specifically, the AP 102 decides whether or not to perform data communication using HARQ in relation to each connected STA. As a specific processing example, the control unit 202 confirms the settings/configuration that are being applied with respect to the AP 102 for the AP 102 itself. Also, for each STA, the AP 102 confirms whether the HARQ element 500 (FIG. 5) is included in a MAC frame that has already been received, and in the case where it is, it confirms whether or not the value of the HARQ support field 503 is 1.

In a case where it is determined by the AP 102 that HARQ is not supported (No in step S801), the retransmission type determination unit 306 decides (step S802) to perform data communication using ARQ rather than performing data communication using HARQ. In the case where it is determined that there is an STA that does not support HARQ among the connected STAs (No in step S801), the retransmission type determination unit 306 decides (step S802) to perform data communication using ARQ in relation to the STA that does not support HARQ. Note that in the case where it is determined that there is an STA that does not support HARQ among the connected STAs (No in step S801), the retransmission type determination unit 306 may decide (step S802) to perform data communication using ARQ in relation to the all of the connected STAs. Also, even in a case where all of the connected STAs support HARQ, if data communication using HARQ cannot be performed with respect to all of the STAs, the retransmission type determination unit 306 may decide to perform data communication using ARQ in relation to some of the STAs. Also, in place of step S801, the AP 102 may decide whether or not to perform data communication using HARQ based on whether or not the HARQ type is set individually for each STA and on whether or not the AP 102 has a capability by which it is able to switch between ARQ and HARQ.

In the case where it is determined (Yes in step S801) that the AP 102 and each connected STA support HARQ, the IR availability determination unit 305, in each set of the AP 102 and respective STA that perform data communication using HARQ, confirms (step S803) the width of the connection band (frequency band) and the buffer region (free capacity of the buffer) that can be used for communication using HARQ-IR. Next, the IR availability determination unit 305, from the confirmed capacity value, determines (step S804) whether or not it can perform data communication using HARQ-IR in that connection bandwidth (whether or not HARQ-IR is available). In a case where the IR availability determination unit 305 determined (No in step S804) that it is not possible to perform data communication using HARQ-IR such as when it is not possible to allocate the capacity of the empty buffer needed for HARQ-IR, the retransmission type determination unit 306 decides (step S807) to perform data communication using HARQ-CC. Meanwhile, the IR availability determination unit 305, in the case where it is determined to be possible to perform data communication using HARQ-IR (Yes in step S804), further determines (step S805) whether or not the STA supports HARQ-IR. This determination may be performed by the MAC frame transmission/reception unit 303 transmitting/receiving the HARQ element 500 in a control frame such as a trigger frame. Also, the determination may be performed based on the content of a MAC frame that the MAC frame transmission/reception unit 303 has already received.

If it is determined that the STA does not support HARQ-IR (No in step S805), the retransmission type determination unit 306 decides (step S807) to perform data communication using HARQ-CC. If it is determined that the STA does not support HARQ-IR (No in step S805), the retransmission type determination unit 306 decides (step S806) to perform data communication using HARQ-IR.

After the decisions of step S802, step S806, and step S807, the processing advances to step S808. In step S808, the MAC frame transmission/reception unit 303 makes a notification to the STA of the decided retransmission type. This notification may be performed using a trigger frame. Also, this notification may be performed using another control frame such as an Action frame or a Block Ack Request frame. After the decided retransmission type notification, the data transmission/reception unit 307 performs data transmission/reception (step S809) using the retransmission type decided by the retransmission type determination unit 306. The trigger frame is used in the notification of step S808, and in a case where the trigger frame simultaneously instructs data communication, the STA may perform data communication using the decided retransmission type only in the instructed Duration time.

Figure 9:
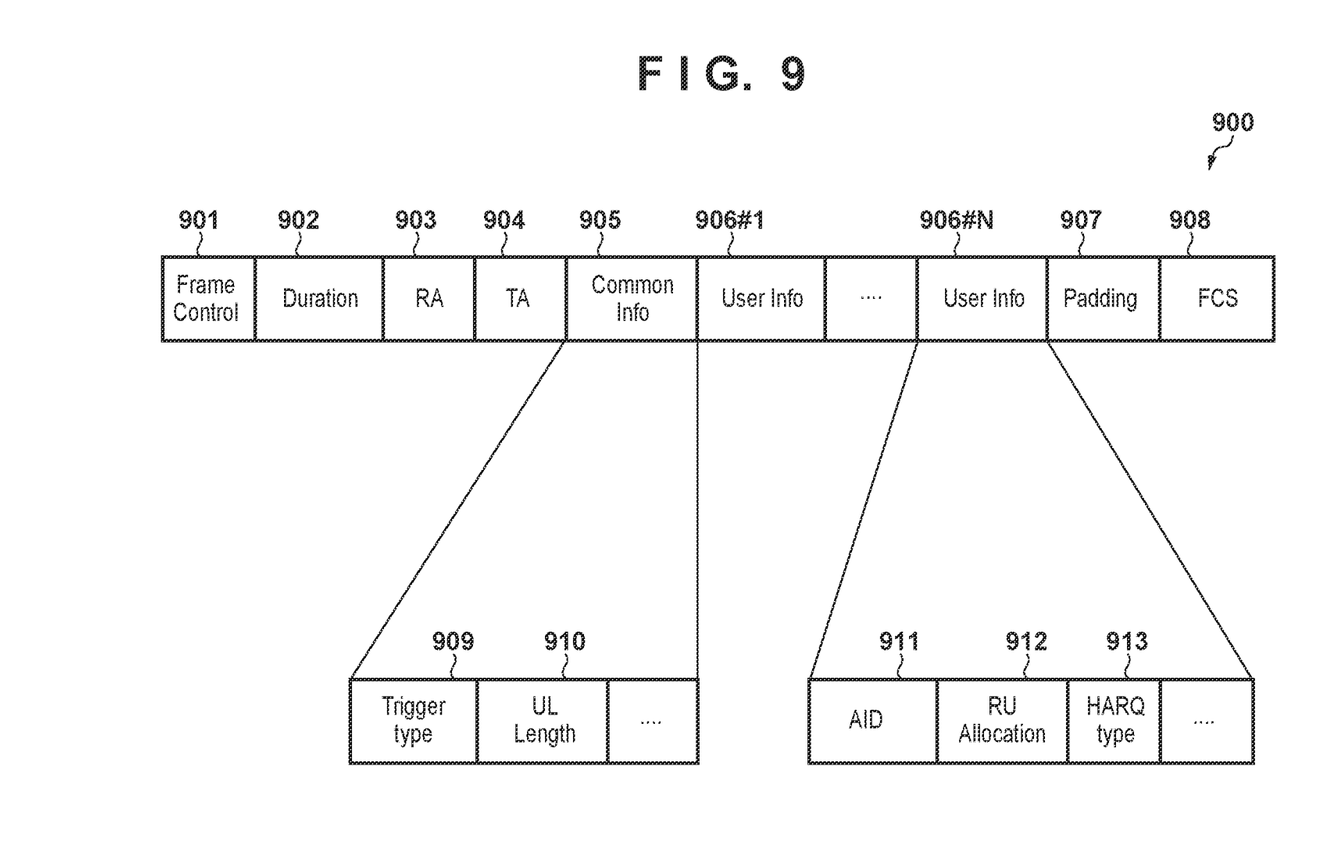
FIG. 9 illustrates an example of a configuration of a trigger frame.

FIG. 9 illustrates an example of a trigger frame that can be used for the notification of step S808. Note that the notification of step S808 may be performed by another frame having a configuration indicated in FIG. 9. The trigger frame 900 of FIG. 9 describes parameters that are common to all STAs in a Common Info field 905. A Trigger Type field 909 indicates the type of the trigger frame. An UL Length field 910 indicates a maximum length of the data frame. A User Info field 906 indicates information that is established for each STA. An AID field 911 is a field for a correspondence as to which STAs stream it is. By considering this, it is possible to determine whether or not the STA made an instruction to self. An RU Allocation field 912 includes location information as to the communication bandwidth assigned to each STA and what band is assigned. In a HARQ type field 913, information indicating that data communication using HARQ is performed or the type of HARQ in a case where data communication using HARQ is performed is included. By considering this value, the STA is enabled to determine which communication method it should communicate by. Also, by arranging the HARQ type field 913 within the User Info field 906, the HARQ type can be changed for each STA. The HARQ type field 913 may be arranged in a different place. For example, when arranged within the Common Info field 905, it is possible to notify the HARQ type to the STAs collectively.

In this way, by virtue of the present embodiment, the AP, based on its HARQ capability, can decide the retransmission type in communication with the STA. Also, it is possible to exchange the type of HARQ to be used in data transmission/reception between the STA and the AP.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-048026, filed Mar. 18, 2020, which is hereby incorporated by reference herein in its entirety.

What is claimed is:

1. A communication apparatus, comprising:
at least one memory that stores a set of instructions; and
at least one processor that executes the instructions for causing, when executed, the communication apparatus to perform operations comprising:
obtaining information of a retransmission type of Hybrid Automatic Repeat Request (HARQ) in compliance with an IEEE 802.11 series standard that can be used by another communication apparatus by communicating with the other communication apparatus;
deciding, based on a retransmission type of the HARQ that the communication apparatus can use and the retransmission type of the HARQ that the other communication apparatus can use, a retransmission type to use for data communication;
after the retransmission type to be used for the other communication apparatus and the data communication is decided, notifying information of a width of a frequency band for the data communication with the communication apparatus and a data rate to the other communication apparatus; and
performing, after the notification of the information, the data communication with the other communication apparatus by using the HARQ of the decided retransmission type.

2. The communication apparatus according to claim 1, wherein the operations further comprise determining, based on a free capacity of a buffer of a memory in the communication apparatus that can be used for the data communication using the HARQ, the retransmission type of the HARQ that the communication apparatus can use.

3. The communication apparatus according to claim 2, wherein, in a case where the free capacity of the buffer is a threshold or more, it is determined that the retransmission types of the HARQ that can be used by the communication apparatus are a first retransmission type and a second retransmission type, and in a case where the free capacity of the buffer does not reach the threshold, it is determined that the retransmission type of the HARQ that can be used by the communication apparatus is the second retransmission type.

4. The communication apparatus according to claim 3, wherein the first retransmission type is an IR (Incremental Redundancy) type, and the second retransmission type is a CC (Chase Combining) type.

5. The communication apparatus according to claim 3, wherein the threshold is set based on at least one of a width of a frequency band in which the communication apparatus and the other communication apparatus connect, and a time that data is to be retained in a memory of the communication apparatus.

6. The communication apparatus according to claim 1, wherein the operations further comprise determining, in a case where a plurality of the other communication apparatuses are connected to the communication apparatus, the retransmission type of the HARQ that the communication apparatus can use in the data communication based on the number of the other communication apparatuses.

7. The communication apparatus according to claim 1, wherein the operations further comprise determining, in a case where the plurality of other communication apparatuses are connected to the communication apparatus, based on whether or not uplink communication or downlink communication is performed with the plurality of other communication apparatuses using a trigger frame, the retransmission type of the HARQ that the communication apparatus can use in the data communication.

8. The communication apparatus according to claim 1, wherein the information of the retransmission type of the HARQ that the other communication apparatus can use is obtained by receiving a management frame at least including the information from the other communication apparatus.

9. The communication apparatus according to claim 1, wherein
in a case where a plurality of the other communication apparatuses are connected to the communication apparatus,
a retransmission type to be used for the data communication is decided in relation to each of the other communication apparatuses,
in relation to each of the other communication apparatuses, a notification of information of the retransmission type to be used, a width of a frequency band, and a data rate for the data communication with the communication apparatus is made, and
after the notification, the data communication in relation to each of the other communication apparatuses is performed by using a decided retransmission type.

10. The communication apparatus according to claim 9, wherein the notification is made using one of a trigger frame, an Action frame, and a Block Ack Request frame.

11. A method for controlling a communication apparatus, the method comprising:
obtaining information of a retransmission type of Hybrid Automatic Repeat Request (HARQ) in compliance with an IEEE 802.11 series standard that can be used by another communication apparatus by communicating with the other communication apparatus;
deciding, based on a retransmission type of the HARQ that the communication apparatus can use and the retransmission type of the HARQ that the other communication apparatus can use, a retransmission type to use for data communication;
after the retransmission type to be used for the other communication apparatus and the data communication is decided, notifying information of a width of a frequency band for the data communication with the communication apparatus and a data rate to the other communication apparatus; and
performing, after the notification of the information, the data communication with the other communication apparatus by using the HARQ of the decided retransmission type.

12. A non-transitory computer-readable storage medium storing a computer program for causing a computer to execute a method for controlling a communication apparatus, the method comprising:
obtaining information of a retransmission type of Hybrid Automatic Repeat Request (HARQ) in compliance with an IEEE 802.11 series standard that can be used by another communication apparatus by communicating with the other communication apparatus;
deciding, based on a retransmission type of the HARQ that the communication apparatus can use and the retransmission type of the HARQ that the other communication apparatus can use, a retransmission type to use for data communication;
after the retransmission type to be used for the other communication apparatus and the data communication is decided, notifying information of a width of a frequency band for the data communication with the communication apparatus and a data rate to the other communication apparatus; and
performing, after the notification of the information, the data communication with the other communication apparatus by using the HARQ of the decided retransmission type.

* * * * *